M. H. Freeman,
Pipe-Cutter.

N°74,527. Patented Feb. 18, 1868.

Witnesses
S. A. Piper.
Jas. H. Mallon

Moses H Freeman
by his attorney
R. H. Eady

United States Patent Office.

MOSES H. FREEMAN, OF SOMERVILLE, MASSACHUSETTS.

Letters Patent No. 74,527, dated February 18, 1868.

IMPROVEMENT IN SELF-FEEDING PIPE-CUTTER.

*The Schedule referred to in these Letters Patent and making part of the same.*

TO ALL PERSONS TO WHOM THESE PRESENTS MAY COME:

Be it known that I, MOSES H. FREEMAN, of Somerville, in the county of Middlesex, and State of Massachusetts, have invented a new and useful Self-Feeding Pipe-Cutter; and do hereby declare the same to be fully described in the following specification, and represented in the accompanying drawings, of which—

Figure 1:
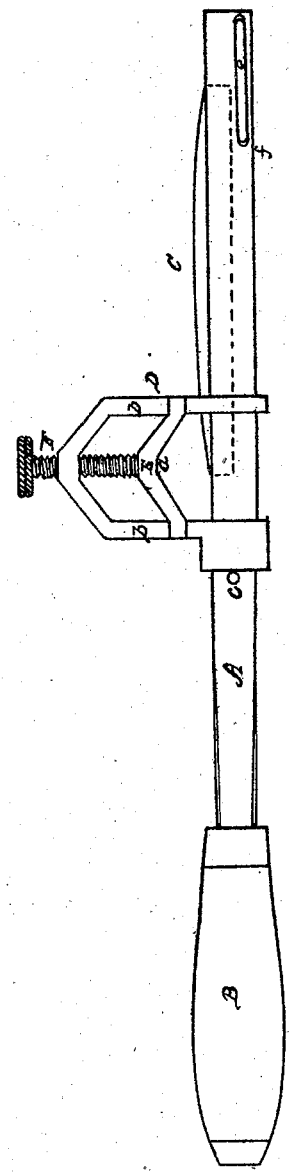
Figure 2:
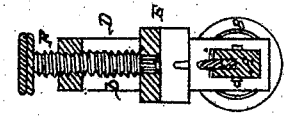

Figure 1 is a side elevation,

Figure 2 a transverse section, and

Figure 3:

Figure 3 a horizontal section of it.

In such drawings, A denotes a long bar of steel, provided with a handle, B, fixed to one end of it. Along the upper edge of such bar, a knife, C, is fixed, such knife being arranged on the bar, and formed with its edge inclined at and near each end, in manner as represented in the drawings. A gallows-frame or carriage, D, formed as exhibited, is applied to the bar A so as to be capable of being slid thereon lengthwise of the bar, such frame or carriage being provided with a presser, E, adapted to it so as to be capable of being moved up or down on the side parts $b$ $b$ of the said carriage. It also has a screw, F, to force such presser downward; and an angular notch, $a$, in the said presser, enables the presser to adapt itself to a pipe of any size, when in the notch, and resting on the cutting-edge of the knife. Furthermore, there is a stationary stud or stop, $c$, extended from one side of the bar A, and at or near the outer end of the said bar there is another such stud, $d$, which goes through a hole in the bar, and is fixed to a spring, $e$, fastened to the bar, and wholly arranged within a recess, $f$, made in the side of the bar, the whole being as represented in figs. 1 and 3.

By pressing the stud $d$ wholly within the bar A, such stud will present no obstruction to the removal of the carriage from the bar, either partially or wholly, but when the stud $d$ projects from the side of the bar, such stud will serve as a stop to arrest the movement of the carriage on the bar, the other stud also being for a similar purpose.

By having the stud $c$ movable, as described, with respect to the bar, we are enabled to slide the carriage partially off the bar, or far enough to admit of a pipe being inserted within the carriage, when it would be inconvenient to otherwise introduce such pipe therein.

In order to cut off a pipe, it is to be extended through the carriage, and the screw thereof is to be turned down, so as to crowd the presser against the pipe, and the latter against one of the inclined parts of the knife-edge; next, the whole instrument is to be turned or revolved on the pipe, so as to cause the carriage to slide on the bar, and the knife to cut into the pipe, the effect produced being the same as that which would result were the pipe rolled along the knife-edge, and at the same time forced firmly against it, so as to cause the said edge to cut into or indent the pipe. By continuing to turn the implement on the pipe, the latter may be cut in twain at the place where it is touched by the knife. A reciprocating rotary motion of the pipe-cutter on the pipe will suffice to effect a separation of the latter.

I claim as my invention—

The combination of the bar A and the knife C, constructed and combined, as described, with mechanism for holding the pipe against, and rolling it on the knife, while the latter may be turned about the pipe, substantially as specified.

I also claim the combination of the bar A, the knife C, the carriage D, and the clamp or presser E, and its adjusting-screw F, or the equivalent of such presser and screw, the whole being arranged and applied together substantially as set forth.

I also claim the combination of the stationary stop $c$ and the spring-stop $d$, with the bar A, the knife C, the carriage D, the presser E, and its screw F, the whole being as specified.

MOSES H. FREEMAN.

Witnesses:

R. H. EDDY,

F. P. HALE, Jr.